United States Patent [19]

Leopold

[11] Patent Number: 5,797,353
[45] Date of Patent: Aug. 25, 1998

[54] OBJECT IMPREGNATED WITH CATNIP FOR ATTRACTING A CAT AND A PROCESS FOR MAKING SAME

[76] Inventor: Arthur B. Leopold. 129 Sandpiper Key, Secacus, N.J. 07094

[21] Appl. No.: 557,612

[22] Filed: Nov. 14, 1995

[51] Int. Cl.⁶ .................................................. A01K 29/00
[52] U.S. Cl. ................................................ 119/710; 119/711
[58] Field of Search .............................. 119/711, 710, 119/707, 702, 709, 28.5

[56] References Cited

U.S. PATENT DOCUMENTS

| | | | |
|---|---|---|---|
| 1,022,113 | 4/1912 | Smith | 119/711 |
| 2,086,631 | 7/1937 | Munro | 272/36 |
| 3,104,648 | 9/1963 | Fisher | 119/711 |
| 4,513,014 | 4/1985 | Edwards | 426/132 |
| 4,557,219 | 12/1985 | Edwards | 119/29.5 |
| 4,771,733 | 9/1988 | Axelrod | 119/29.5 |
| 4,928,632 | 5/1990 | Gordon | 119/29.5 |
| 5,033,410 | 7/1991 | Sigurdsson | 119/29.5 |
| 5,035,425 | 7/1991 | Edwards | 273/60 B |
| 5,221,782 | 6/1993 | Aida et al. | 524/451 |
| 5,241,925 | 9/1993 | Gertner et al. | 119/654 |
| 5,339,771 | 8/1994 | Axelrod | 119/710 |
| 5,366,732 | 11/1994 | Zighelboim | 119/670 |
| 5,419,283 | 5/1995 | Leo | 119/709 |

*Primary Examiner*—Edgar S. Burr
*Assistant Examiner*—Anthony H. Nguyen
*Attorney, Agent, or Firm*—Ohlandt, Greeley, Ruggiero & Perle

[57] ABSTRACT

There is provided a plastic object for attracting a cat formed by impregnating particulate matter, such as particles of catnip, into the object during the molding process. Preferably, the plastic is a soft, pliable thermoplastic, such as styrene-butadiene-styrene block copolymer, ethylene vinyl acetate copolymer, a polyethylene homopolymer or a flexible polyvinyl chloride compound. The plastic object is structurally sound to avoid excessive wear and tear and, yet, soft and pliable to permit a cat to enjoy the object and provide consumers with the perception that the object will not hurt the cat. Furthermore, the molded object has the aroma of the catnip emitting therefrom.

28 Claims, 1 Drawing Sheet

OBJECT IMPREGNATED WITH CATNIP FOR ATTRACTING A CAT AND A PROCESS FOR MAKING SAME

BACKGROUND OF THE INVENTION

I. Field of the Invention

The present invention relates generally to objects for attracting a cat by activating one or more of its senses. More particularly, the present invention relates to pet-related products that include plastic objects impregnated with catnip to excite one or more senses of a cat. Further, the object is adapted to be injection molded.

II. Description of the Prior Art

A cat is very attracted to scents, especially to the scent of the herb commonly known as catnip. Accordingly, a cat is attracted to products that have the scent of catnip. Thus, attempts have been made to store catnip in the body of a cat product in order to attract cats. For example, U.S. Pat. No. 2,086,631 to H. W. Munro, which issued on Jul. 13, 1937, and U.S. Pat. No. 4,928,632 to R. A. Gordon, which issued on May 29, 1990, provide cat toys for dispensing catnip. Another way for attracting cats is to mold catnip in the body of a cat product, as provide in U.S. Pat. No. 1,022,113 to W. E. Smith, which issued on Apr. 2, 1912. Also, U.S. Pat. No. 1,022,113 provides a ball toy for cats that is made either partially or completely of a catnip compound. The catnip compound is made by mixing catnip with wood or paper pulp.

In addition to selecting the appropriate flavorant (i.e., catnip) for the catnip compound, it is equally as important to select a suitable base material. One key factor in choosing a suitable base material for a catnip compound is its pliability so that a cat will enjoy the product. Also, the base material should appear pliable in order to comfort the owner of the cat. For these reasons, harder or coarser materials, such as wood or paper pulp, are not preferred for cat products.

Besides wood or paper pulp based products, other types of pet-related toys for attracting animals are known. However, such pet-related toys are not intended for cats and, thus, do not necessarily include catnip. For example, U.S. Pat. No. 5,339,771 to Axelrod is directed to a plastic chew toy for dogs that is appealing to dogs and excites their chewing instincts. The chew toy is formed of a molded synthetic thermoplastic resin with animal meal dispersed in the resin. The synthetic thermoplastic resin may be formed of materials commonly used for animal chew toys, such as nylon, polyurethane, or a mixture of nylon and polyurethane. Other examples of chew toys that include polyurethane are provided in U.S. Pat. No. 4,771,733 to H. R. Axelrod, which issued on Sep. 20, 1988; U.S. Pat. No. 4,513,014 to P. L. Edwards, which issued on Apr. 23, 1985; U.S. Pat. No. 4,557,219 to P. L. Edwards, which is a division of U.S. Pat. No. 4,513,014 and issued on Dec. 10, 1985; and U.S. Pat. No. 5,035,425 to P. L. Edwards, which issued on Jul. 30, 1991.

The above patents, which generally describe chew toys that are intended to be chewed by animals having large teeth, namely dogs, are directed to the use of materials that are best suited to withstand chewing, such as polyurethane, nylon and/or mixtures thereof. In fact, U.S. Pat. Nos. 4,513,014 and 4,557,219 state specifically that polyurethane is preferred for such chew toys due to its unique distinction of being essentially indestructible by ordinary chewing forces and its resistance to shearing by sharp teeth that would normally disintegrate other types of elastomers, such as various rubber-like compounds, resins and polyethylenes.

Polyethylene is more chemical resistant that polyurethane, however not as chew resistant. Accordingly, when used in a dog bone, a plurality of polyethylene fibers are grouped together to form the synthetic dog bone as shown in U.S. Pat. No. 5,033,410 to E. H. Sigurdsson, which issued on Jul. 23, 1991. In this patent, the polyethylene fibers of the chewing toy may be impregnated by boiling in a flavoring media such as cod liver oil or beef broth. However, even the incorporation of a cod liver oil flavorant, this polyethylene product is far less effective than catnip to attract a cat.

In contrast to dogs and other animals that chew objects regularly, cats do not chew. Cats, instead, scratch and lick objects. While polyurethane is a preferred material for chew toys since it is harder and more tear resistant to chewing, polyurethane is not beneficial for cat products since it is a harder, stiffer, less pliable material. As stated above, the base material should be pliable so that a cat will enjoy the product and consumers will be swayed favorably to the product.

Therefore, a soft material is preferred. For this reason, hard, stiffer indestructible type materials, such as polyurethane, are not preferred.

Heretofore, there is a need for a material composition for cat products that is pliable enough that a cat will enjoy the product, and consumer perception will be swayed to the benefit of the product. In addition, the material composition should include a potent cat flavorant, preferably catnip, to attract a cat.

SUMMARY OF THE INVENTION

Against the foregoing background, it is a primary object of the present invention to provide plastic object that is pliable enough that a cat will enjoy the product, and a consumer will perceive that the product will not hurt the cat.

It is another object of the present invention to provide such a plastic object that is impregnated with a potent cat flavorant, preferably catnip, to attract a cat.

It is still another object of the present invention to provide such a plastic object that appeals to a cat's sense of smell, touch and taste and, thus, promote the cat's attraction to the object, and the cat owner's sense of sight.

It is a further object of the present invention to provide such a plastic object that can be made by injection molding.

To accomplish the foregoing objects and advantages, the present invention, in brief summary, is a plastic object for attracting members of the cat family, that comprises a base material and a plurality of catnip particles dispersed throughout the base material. After combining the base material and the plurality of catnip particles, the plastic object may be molded into a shape suitable for a pet-related product. Preferably, the base material is one of the following: styrene-butadiene-styrene block copolymer, ethylene vinyl acetate copolymer, a polyethylene homopolymer or a flexible polyvinyl chloride compound.

The present invention is also a method for making a plastic object having a plurality of discrete particles of catnip therein that comprises an initial step of forming a base material selected from the group consisting of styrene-butadiene-styrene block copolymer, ethylene vinyl acetate copolymer, a polyethylene homopolymer and a flexible polyvinyl chloride compound. The plurality of discrete particles of catnip are then mixed with the base material for a predetermined period of time to form a catnip including mixture. The catnip including mixture is then injection molded to form the plastic object.

BRIEF DESCRIPTION OF THE DRAWINGS

The foregoing and still further the objects and advantages of the present invention will be more apparent from the following detailed explanation of the preferred embodiments of the invention in connection with the accompanying drawing:

The figure is a sectional view of a plastic object impregnated with catnip in accordance with the preferred embodiment of the present invention.

DETAILED DESCRIPTION OF THE PREFERRED EMBODIMENT

Figure 1:
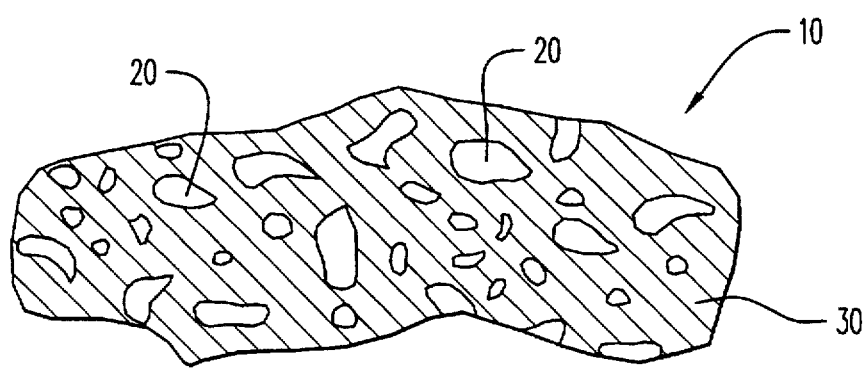

Referring to the Figure, there is provided a plastic object of the preferred embodiment which is generally represented by reference numeral 10. As shown in the Figure, a plurality of discrete catnip particles 20 are dispersed throughout the object 10. The present invention may be used for, but is not limited to, various pet-related products for cats such as a grooming products, furniture covers or protectors, and pet toys. Examples of grooming products include a grooming toy or mat, and examples of pet toys include a ball, yo-yo, Frisbee, and wand and dangler.

The base material 30 of the preferred embodiment is made of either a styrene-butadienestyrene block copolymer or an ethylene vinyl acetate copolymer. Both materials may be enjoyed by cats and are known not to be harmful to animals. These two base materials are soft, pliable materials that are suitable for cat products. Equally as important, these base materials do not mask or cover the aroma of an attractant, such as catnip, that is included therein.

For a preferred embodiment, the base material 30 is semi-transparent or translucent so that the impregnated catnip particles 20 is visible from the base material 30. More importantly, a semi-transparent or translucent base material 30 does not mask or cover the aroma of the attractant. Color additives may, however, be used provided they do not obstruct, mask, cover, or camouflage the catnip aroma of the product.

The styrene-butadiene-styrene block copolymer of the present invention includes, but is not limited to, the following types of compounds: linear for extruding, radial for molding, thermoplastic, and thermoset for molding through high frequency. The preferred embodiment includes a radial for molding type of styrene-butadiene-styrene block copolymer.

The styrene-butadiene-styrene block copolymer may have various ingredients to improve its qualities. Such ingredients include process oil; styrenic polymer, such as, for example, zinc stearate; filler, such as, for example, magnesium carbonate or calcium carbonate; antioxidant/stabilizers; dusting agent, such as, for example, talc, hydrated amorphous silica; and pigment. The process oil may make the material softer and pliable, and the styrenic polymer may add stiffness to the material for better molding flow. The antioxidant/stabilizer may stop product breakdown from the environment, such as ultraviolet rays, and the dusting agent may prevent the material from clumping together when molding. In addition, the pigment may be used to add color to the material.

One such material that includes all of the above ingredients is available under the name Uni-Grip-100-T.P.R. by Gator Industries, Inc. in Hialeah, Fla. Uni-Grip-100-T.P.R. includes styrene-butadiene-styrene block copolymer, process oil, styrenic polymer, filler, antioxidant/stabilizer, dusting agent and pigment.

Also, thermoplastic rubber material sold under the marks Kraton D1101 and D2104 by Shell Oil Company may be used. Kraton D1101 thermoplastic rubber includes less than 99% styrene-butadiene-styrene block copolymer, less than 1% antioxidant/stabilizer, less than 5% calcium carbonate, less than 5% hydrated amorphous silica and less than 2% talc. Kraton D2104 thermoplastic rubber includes less than 65% styrene-butadiene-styrene block copolymer, less than 40% mineral oil, less than 1% each of zinc stearate, antioxidant/stabilizers and magnesium carbonate.

A third or alternative base material 30 is a polyethylene homopolymer. The particular polyethylene homopolymer that has been used in the present invention is polyethylene 7791 from Gator Industries, Inc. It is a translucent white, solid pellets or granules having a specific gravity of 0.91 to 0.97. Similar to styrene-butadiene-styrene block copolymer and ethylene vinyl acetate copolymer base materials, a polyethylene homopolymer does not have an odor to disguise the scent or aroma of the catnip particles 20.

As a fourth option, another alternative base material 30 is a flexible polyvinyl chloride compound. An additive, such as a plasticizer, may be added to polyvinyl chloride to provide soft and flexible characteristics for the flexible polyvinyl chloride compound. The flexible polyvinyl chloride compound has a different look and feel and is heavier than the styrene-butadiene-styrene block copolymer. Thus, for those instance where these characteristics are preferred, the flexible polyvinyl chloride compound may be used as the base material 30.

The catnip particles 20 must have an aroma and texture that attracts cats, such as dry catnip, adulterated catnip, catnip oil and the like. The preferred embodiment includes particles of one hundred percent pure, dry catnip. Although other types of cat attracting flavorants may be substituted for catnip, catnip is most preferred. For example, catnip oil must be vacuumed out of certain plant matter and, thus, is very expensive to manufacture. Accordingly, catnip oil is an expensive alternative to dry catnip.

The ratio of the catnip particles 20 to the base material 30 must be such that a sufficient amount of catnip particles are used to attract cats and yet sufficient base material is used to form a plastic object that is structurally stable. Since a particular amount of catnip is more expensive than the same amount of a base material, the ratio may vary and is restricted primarily by economic considerations. In particular, it is preferred that the catnip particles 20 comprise about 0.5% to about 10.0%, by weight, of the total composition of the plastic object 10. For the preferred embodiment, the catnip particles 20 comprise about 1.0%, by weight, of the total composition of the plastic object 10.

Although not required, mineral oil may be added to the mixture of the base material 30 and the catnip particles 20 in order to evenly spread the catnip particles throughout the base is material during the molding or formation process. The base material 30 and the catnip particles 20 may be mixed together using a hand mixer, material tumbler, hopper, or the like. Typically, the base material is in the form of pellets or granules. Then, samples of the final product are injection molded from the mixture. Accordingly, the mineral oil is added to the mixture so that the catnip particles 20 will adhere to the pellets or granules of base material 30 and, thus, avoids separation of the materials during the mixing process.

EXAMPLE

For the preferred embodiment, 100 lbs. of thermoplastic, in pellet form, is combined with 1 lb. of pure, dry catnip and 1 ounce of mineral oil. Specifically, the thermoplastic is any one of the four materials, namely styrene-butadiene-styrene block copolymer, ethylene vinyl acetate copolymer, polyethylene homopolymer or flexible polyvinyl chloride compound.

During the production process, the catnip is mixed and blended with thermoplastic pellets and the resultant mixture is formed by injection molding. The thermoplastic pellets and the mineral oil are placed in a material tumbler that mixes the materials for a first period of time of about 15 minutes. The catnip is then added to the thermoplastic/mineral oil mixture, and the material tumbler mixes the thermoplastic, mineral oil and catnip for a second period of time of about 15 minutes. Then, the thermoplastic/mineral oil/catnip mixture is injection molded in a screw-based molder. The mineral oil becomes part of the resultant mixture, and the catnip is suspended in the thermoplastic. The resultant mixture is depicted as the object 10 in the Figure.

For testing, the preferred embodiment was molded into two sets of plastic brushes provided to eight cat owners for testing on their cats. One set of plastic brushes were comprised of styrene-butadiene-styrene block copolymer, specifically Uni-Grip-100-T.P.R. described above, and another set of plastic brushes were comprised of ethylene vinyl acetate copolymer. Each cat owner was provided with a brush from each set. The results of this testing show that cats are highly attracted to the material of both plastic brushes and will play with the brushes longer than most cats would with cat toys. The cats had the plastic brushes to play with for a three month period with no wear or tear to the material of the brushes.

Similar results were achieved when testing two types of grooming pads. One type of grooming pad was made of styrene-butadiene-styrene block copolymer, and the other type was made of ethylene vinyl acetate copolymer. Again, the cats were immediately attracted to the pads and played with the grooming pads for an extended period of time.

The invention having been thus described with particular reference to the preferred forms thereof, it will be obvious that various changes and modifications may be made therein without departing from the spirit and scope of the invention as defined in the appended claims.

Wherefore, I claim:

1. A plastic object for attracting a cat, comprising:
catnip particles dispersed throughout a pliable base material that does not mask an odor of said catnip particles dispersed therein, said pliable base material being selected from the group consisting of a styrene-butadiene-styrene block copolymer, an ethylene vinyl acetate copolymer, a polyethylene homopolymer and a flexible polyvinyl chloride compound.

2. The plastic object of claim 1, wherein said pliable base material further comprises at least one material selected from the group consisting of: process oil, styrenic polymer, filler, antioxidant, stabilizer and dusting agent.

3. The plastic object of claim 2, wherein said pliable base material comprises at least one material selected from the group consisting of: zinc stearate, magnesiuim carbonate, calcium carbonate, talc and hydrated amorphous silica.

4. The plastic object of claim 1, wherein the plastic object is a toy.

5. The plastic object of claim 1, wherein the plastic object is an animal grooming product.

6. The plastic object of claim 1, wherein the plastic object is a mat.

7. The plastic object of claim 1, wherein the plastic object is a ball.

8. A plastic object for attracting a cat, comprising:
catnip particles dispersed throughout a pliable base material that does not mask an odor of said catnip particles dispersed therein, said pliable base material being a styrene-butadiene-styrene block copolymer,
wherein the plastic object is injection molded into a desired shape.

9. The plastic object of claim 8, wherein said pliable base material is substantially clear, and wherein said catnip particles are visible through said pliable base material.

10. The plastic object of claim 8, further comprising mineral oil for adhering said catnip particles to said pliable base material while said catnip particles are dispersed throughout said pliable base material.

11. The plastic object of claim 8, wherein said pliable base material further comprises at least one material selected from the group consisting of: process oil, styrenic polymer, filler, antioxidant, stabilizer and dusting agent.

12. The plastic object of claim 11, wherein said pliable base material comprises at least one material selected from the group consisting of: zinc stearate, magnesiuim carbonate, calcium carbonate, talc and hydrated amorphous silica.

13. The plastic object of claim 8, wherein said plurality of catnip particles are uniformly distributed into said pliable base material.

14. The plastic object of claim 8, wherein said catnip particles are one hundred percent pure, dry catnip.

15. A plastic object for attracting a cat, comprising:
catnip particles dispersed throughout a pliable base material that does not mask an odor of said catnip particles dispersed therein, said pliable base material being an ethylene vinyl acetate copolymer,
wherein the plastic object is injection molded into a desired shape.

16. The plastic object of claim 15, wherein said pliable base material is substantially clear, and wherein said catnip particles are visible through said pliable base material.

17. The plastic object of claim 15, further comprising mineral oil for adhering said catnip particles to said pliable base material while said catnip particles are dispersed throughout said pliable base material.

18. The plastic object of claim 15, wherein said pliable base material further comprises at least one material selected from the group consisting of: process oil, styrenic polymer, filler, antioxidant, stabilizer and dusting agent.

19. The plastic object of claim 18, wherein said pliable base material comprises at least one material selected from the group consisting of: zinc stearate, magnesiuim carbonate, calcium carbonate, talc and hydrated amorphous silica.

20. The plastic object of claim 15, wherein said catnip particles are one hundred percent pure, dry catnip.

21. A plastic object for attracting a cat, comprising:
catnip particles dispersed throughout a pliable base material that does not mask an odor of said catnip particles dispersed therein, said pliable base material being a polyethylene homopolymer,
wherein the plastic object is injection molded into a desired shape.

22. The plastic object of claim 21, further comprising mineral oil for adhering said catnip particles to said pliable base material while said catnip particles are dispersed throughout said pliable base material.

23. The plastic object of claim 21, wherein said catnip particles are one hundred percent pure, dry catnip.

24. A plastic object for attracting a cat, comprising:

catnip particles dispersed throughout a pliable base material that does not mask an odor of said catnip particles dispersed therein, said pliable base material being a flexible polyvinyl chloride compound, wherein the plastic object is injection molded into a desired shape.

25. The plastic object of claim 21, further comprising mineral oil for adhering said catnip particles to said pliable base material while said catnip particles are dispersed throughout said pliable base material.

26. The plastic object of claim 21, wherein said catnip particles are one hundred percent pure, dry catnip.

27. A method for making a pliable plastic object for attracting a cat having a plurality of discrete particles of catnip therein, comprising:

forming a pliable base material being selected from the group consisting of a styrene-butadiene-styrene block copolymer, an ethylene vinyl acetate copolymer, a polyethylene homopolymer and a flexible polyvinyl chloride compound, mixing the plurality of discrete catnip particles with said pliable base material for a predetermined period of time to form a catnip including mixture, wherein said pliable base material does not mask an odor of said catnip particles mixed therein; and injection molding said catnip including mixture to form the pliable plastic object.

28. The method of claim 27, further comprising forming said pliable base material into pellets, and mixing mineral oil with said pellets of said pliable base material, prior to mixing with said plurality of catnip particles.

* * * * *